US011715002B2

(12) United States Patent
Phanishayee et al.

(10) Patent No.: US 11,715,002 B2
(45) Date of Patent: Aug. 1, 2023

(54) EFFICIENT DATA ENCODING FOR DEEP NEURAL NETWORK TRAINING

(71) Applicant: MICROSOFT TECHNOLOGY LICENSING, LLC, Redmond, WA (US)

(72) Inventors: Amar Phanishayee, Redmond, WA (US); Gennady Pekhimenko, Toronto (CA); Animesh Jain, Ann Arbor, MI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1266 days.

(21) Appl. No.: 16/024,311

(22) Filed: Jun. 29, 2018

(65) Prior Publication Data

US 2019/0347549 A1 Nov. 14, 2019

Related U.S. Application Data

(60) Provisional application No. 62/669,696, filed on May 10, 2018.

(51) Int. Cl.
*G06N 3/08* (2023.01)
*G06F 12/02* (2006.01)

(52) U.S. Cl.
CPC .......... *G06N 3/08* (2013.01); *G06F 12/0223* (2013.01)

(58) Field of Classification Search
CPC ........ G06N 3/08; G06N 3/0481; G06N 3/084; G06N 3/105; G06N 3/0454; G06N 3/04; G06F 12/0223; G06F 9/5016; G06F 12/02
See application file for complete search history.

(56) References Cited

U.S. PATENT DOCUMENTS

| 2017/0132513 | A1* | 5/2017 | Yu | G06N 3/08 |
| 2018/0299841 | A1* | 10/2018 | Appu | G06N 5/047 |
| 2018/0350110 | A1* | 12/2018 | Cho | G06T 9/004 |
| 2019/0197420 | A1* | 6/2019 | Singh | G06N 3/082 |
| 2019/0228284 | A1* | 7/2019 | Holland | G06N 3/047 |

(Continued)

OTHER PUBLICATIONS

Xie et al., "Resource-Constrained Implementation and Optimization of a Deep Neural Network for Vehicle Classification," Aug. 29-Sep. 2, 2016, 24th European Signal Processing Conference (EUSIPCO) (Year: 2016).*

(Continued)

*Primary Examiner* — Miranda M Huang
*Assistant Examiner* — Yao David Huang
(74) *Attorney, Agent, or Firm* — Newport IP, LLC; Leonard J. Hope

(57) ABSTRACT

Functions are added to a deep neural network ("DNN") computation graph for encoding data structures during a forward training pass of the DNN and decoding previously-encoded data structures during a backward training pass of the DNN. The functions added to the DNN computation graph can be selected based upon on the specific layer pairs specified in the DNN computation graph. Once a modified DNN computation graph has been generated, the DNN can be trained using the modified DNN computation graph. The functions added to the modified DNN computation graph can reduce the utilization of memory during training of the DNN.

19 Claims, 10 Drawing Sheets

(56) References Cited

U.S. PATENT DOCUMENTS

2019/0303025 A1* 10/2019 Sekiyama ............. G06F 3/0631

OTHER PUBLICATIONS

Parashar et al., "SCNN: An Accelerator for Compressed-sparse Convolutional Neural Networks, " May 2017, ACM SIGARCH Computer Architecture News, vol. 45 Issue 2, pp. 27-40 (Year: 2017).*
Rhu et al., "vDNN: Virtualized Deep Neural Networks for Scalable, Memory-Efficient Neural Network Design," arXiv:1602.08124v3 [cs.DC] Jul. 28, 2016 (Year: 2016).*
"International Search Report and Written Opinion Issued in PCT Application No. PCT/US19/029762", dated Jul. 31, 2019, 13 Pages.
Xie, et al., "Resource-constrained Implementation and Optimization of a Deep Neural Network for Vehicle Classification", In Proceedings of 24th European Signal Processing Conference, Aug. 29, 2016, pp. 1862-1866.
Rotem, et al., "Glow: Graph Lowering Compiler Techniques for Neural Networks", In repository of arxiv, arXiv: 1805.00907v2, May 4, 2018, 10 Pages.
Jain, et al., "Gist: Efficient Data Encoding for Deep Neural Network Training", In Proceedings of 45th International Symposium on Computer Architecture, Jun. 2, 2018, 14 Pages.
Hill, et al., "DeftNN: Addressing Bottlenecks for DNN Execution on GPUs via Synapse Vector Elimination and Near-compute Data Fission", MICRO-50, Oct. 14-18, 2017, Cambridge, MA, USA, © 2017 Association for Computing Machinery, 14 pages.
"Nvidia GeForce GTX Titan X", Retrieved From https://www.geforce.com/hardware/desktop-gpus/geforce-gtx-titan-x/specifications. Retrieved on: Dec. 10, 2017, 2 Pages.
Abadi, et al., "TensorFlow: A System for Large-scale Machine Learning", In Proceedings of the 12th USENIX Symposium on Operating Systems Design and Implementation, Nov. 2, 2016, pp. 265-283.
Albericio, et al., "Cnvlutin: Ineffectual-Neuron-Free Deep Neural Network Computing", In Proceedings of the 43rd International Symposium on Computer Architecture, Jun. 18, 2016, pp. 1-13.
Judd, et al., "Proteus: Exploiting numerical precision variability in deep neural networks", In Proceedings of the International Conference on Supercomputing, Jun. 1, 2016, 6 Pages.
Bottou, Leon, "Large-Scale Machine Learning with Stochastic Gradient Descent", In Proceedings of 19th International Conference on Computational Statistics, Aug. 22, 2010, pp. 1-10.
Chen, et al., "DianNao: A Small-Footprint High-Throughput Accelerator for Ubiquitous Machine-Learning", In Proceedings of 19th International Conference on Architectural Support for Programming Languages and Operating Systems, Mar. 1, 2014, 15 Pages.
Chen, et al., "Eyeriss: A Spatial Architecture for Energy-Efficient Dataflow for Convolutional Neural Networks", In Proceedings of 43rd Annual International Symposium on Computer Architecture, Jun. 18, 2016, pp. 367-379.
Chen, et al., "Training deep nets with sublinear memory cost", In Journal of Computing Research Repository, Apr. 2016, pp. 1-12.
Chetlur, et al., "cuDNN: Efficient Primitives for Deep Learning", In Journal of Computing Research Repository, Oct. 2014, pp. 1-9.
Zhang, et al., "Caffeine: Towards uniformed representation and acceleration for deep convolutional neural networks", In Proceedings of the 35th International Conference on Computer-Aided Design, Nov. 7, 2016, 8 Pages.
Cui, et al., "GeePS: Scalable deep learning on distributed GPUs with a GPU-specialized parameter server", In Proceedings of the Eleventh European Conference on Computer Systems, Apr. 18, 2016, 16 Pages.
Cun, et al., "Handwritten Digit Recognition with a Back-propagation Network", In Proceedings of Advances in neural information processing systems, Nov. 26, 1990, pp. 396-404.
Dean, et al., "Build and train machine learning models on our new Google Cloud TPUs", Retrieved From https://www.blog.google/topics/google-cloud/google-cloud-offer-tpus-machine-learning/, May 17, 2017, 10 pages.
Delmas, et al., "Dynamic stripes: Exploiting the dynamic precision requirements of activation values in neural networks", In Journal of Computing Research Repository, Jun. 2017, 3 Pages.
Goyal, et al., "Accurate, Large Minibatch SGD: Training ImageNet in 1 hour", In Journal of Computing Research Repository, Jun. 2017, pp. 1-12.
Grefenstette, "A deep architecture for semantic parsing", In Journal of Computing Research Repository, Apr. 2014, 6 Pages.
Gruslys, et al., "Memory-Efficient Backpropagation Through Time", In Journal of Computing Research Repository, Jun. 2016, 14 Pages.
Gupta, et al., "Deep Learning with Limited Numerical Precision", In Proceedings of the 32nd International Conference on Machine Learning, Jun. 6, 2015, pp. 1-10.
Gysel, et al., "Hardware-Oriented Approximation of Convolutional Neural Networks", In Journal of Computing Research Repository, Apr. 2016, pp. 1-8.
Han, et al., "Deep compression: Compressing deep neural networks with pruning, trained quantization and huffman coding", In Journal of Computing Research Repository, Oct. 2015, pp. 1-14.
Han, et al., "EIE: Efficient Inference Engine on Compressed Deep Neural Network", In Proceedings of the 43rd International Symposium on Computer Architecture, Jun. 18, 2016, pp. 243-254.
Han, et al., "Learning both weights and connections for efficient neural network", In Proceedings of Advances in neural information processing systems, Dec. 7, 2015, pp. 1-9.
Hanson, et al., "Comparing Biases for Minimal Network Construction with Back-propagation", In Proceedings of Advances in neural information processing systems, Nov. 27, 1989, pp. 177-185.
Hassibi, et al., "Second order derivatives for network pruning: Optimal brain surgeon", In Proceedings of Advances in Neural Information Processing Systems, Nov. 30, 1992, pp. 164-171.
Hauswald, et al., "DjiNN and Tonic: DNN as a service and its implications for future warehouse scale computers", In Proceedings of ACM SIGARCH Computer Architecture News, vol. 43, Issue 3, Jun. 13, 2015, 14 Pages.
He, et al., "Deep residual learning for image recognition", In Journal of Computing Research Repository, Dec. 2015, pp. 1-12.
Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 2012, 27 Pages.
Jouppi, et al., "In-Datacenter Performance Analysis of a Tensor Processing Unit", In Proceedings of the 44th Annual International Symposium on Computer Architecture, Jun. 24, 2017, pp. 1-12.
Judd, et al., "Stripes: Bit-serial deep neural Computing", In Proceedings of 49th Annual IEEE/ACM International Symposium on Microarchitecture, Oct. 15, 2016, 12 Pages.
Kalchbrenner, et al., "A convolutional neural network for modelling sentences", In Journal of Computing Research Repository, Apr. 2014, 11 Pages.
Karpathy, et al., "Large-Scale Video Classification with Convolutional Neural Networks", In Proceedings of IEEE Conference on Computer Vision and Pattern Recognition, Jun. 23, 2014, pp. 1725-1732.
Krizhevsky, et al., "Imagenet classification with deep convolutional neural networks", In Proceedings of the 25th International Conference on Neural Information Processing Systems, vol. 1, Dec. 3, 2012, pp. 1-9.
Cun, et al., "Optimal brain damage", In Proceedings of Advances in Neural Information Processing Systems, Nov. 26, 1990, pp. 598-605.
Lee, et al., "Adaptive-latency DRAM: Optimizing DRAM timing for the common-case", In Proceedings of 21st IEEE International Symposium on High Performance Computer Architecture, Feb. 7, 2015, pp. 1-13.
Lin, et al., "Network in network", In Journal of Computing Research Repository, Dec. 2013, pp. 1-10.

(56) References Cited

OTHER PUBLICATIONS

Parashar, et al., "SCNN: An accelerator for compressed-sparse convolutional neural networks", In Proceedings of the 44th Annual International Symposium on Computer Architecture, Jun. 24, 2017, pp. 1-12.
Reagen, et al., "Minerva: Enabling low-power, highly-accurate deep neural network accelerators", In Proceedings of the 43rd International Symposium on Computer Architecture, Jun. 18, 2016, 12 Pages.
Rhu, et al., "Compressing DMA engine: Leveraging activation sparsity for training deep neural networks", In Journal of Computing Research Repository, May 2017, pp. 1-14.
Rhu, et al., "vDNN: Virtualized deep neural networks for scalable, memory-efficient neural network design", In Proceedings of 49th Annual IEEE/ACM International Symposium on Microarchitecture, Oct. 15, 2016, 13 Pages.
Rumelhart, et al., "Learning Representations by Back-Propagating Errors", In Journal of Nature, vol. 323, Oct. 9, 1986, pp. 533-536.
Russakovsky, et al., "ImageNet Large Scale Visual Recognition Challenge", In Journal of Computing Research Repository, Sep. 2014, pp. 1-43.
Sa, et al., "Understanding and optimizing asynchronous low-precision stochastic gradient descent", In Proceedings of the 44th Annual International Symposium on Computer Architecture, Jun. 24, 2017, 14 Pages.
Seide, et al., "CNTK: Microsoft's Open-Source Deep-Learning Toolkit", In Proceedings of the 22Nd ACM SIGKDD International Conference on Knowledge Discovery and Data Mining, Aug. 13, 2016, p. 2135.
Sermanet, et al., "OverFeat: Integrated recognition, localization and detection using convolutional networks", In Journal of Computing Research Repository, Dec. 2013, pp. 1-16.
Sharify, et al., "Loom: Exploiting weight and activation precisions to accelerate convolutional neural networks", In Journal of Computing Research Repository, Jun. 2017, 8 Pages.
Simonyan, et al., "Very deep convolutional networks for large-scale image recognition", In Journal of the Computing Research Repository, Sep. 2014, pp. 1-14.
Szegedy, et al., "Going deeper with convolutions", In Proceedings of IEEE Conference on Computer Vision and Pattern Recognition, Jun. 7, 2015, pp. 1-9.
Venkataramani, et al., "ScaleDeep: A scalable compute architecture for learning and evaluating", In Proceedings at the 44th Annual International Symposium on Computer Architecture, Jun. 24, 2017, pp. 13-26.
Vinyals, et al., "Show and Tell: A Neural Image Caption Generator", In Journal of Computing Research Repository, Nov. 2014, 9 pages.
Yu, et al., "Scalpel: Customizing DNN pruning to the underlying hardware parallelism", In Proceedings of the 44th Annual International Symposium on Computer Architecture, Jun. 24, 2017, pp. 548-560.
"Office Action Issued in Indian Patent Application No. 202017048353", dated Aug. 10, 2022, 7 Pages.

\* cited by examiner

EFFICIENT DATA ENCODING FOR DEEP NEURAL NETWORK TRAINING

CROSS-REFERENCE TO RELATED APPLICATIONS

This application claims priority under 35 U.S.C. § 119(e) to U.S. Provisional Patent Application No. 62/669,696 filed on May 10, 2018 and entitled "Efficient Data Encoding for Deep Neural Network Training," the disclosure of which is expressly incorporated by reference herein in its entirety.

BACKGROUND

The availability of powerful computing resources has enabled a new breed of deep neural networks ("DNNs") that are capable of solving previously intractable problems such as image classification, translation, and speech processing. These DNNs are trained by repeatedly iterating over datasets.

Widely used DNN training processes have large compute and memory requirements and, therefore, typically use graphics processing units ("GPUs") as their primary compute platform. However, as DNNs have grown larger and deeper, the size of available GPU main memory has become a significant bottleneck. This limits the size of DNNs that can be trained and, as a result, limits DNNs from solving even more complex problems.

It is with respect to these and other technical challenges that the disclosure made herein is presented.

SUMMARY

Technologies are disclosed herein for efficient data encoding for deep neural network training. In addition to other technical benefits, the disclosed technologies can reduce the memory utilization of DNNs during training with little impact on performance. By reducing the memory footprint of DNNs during training, the disclosed technologies enable larger amounts of training data to be stored in memory for use in training very deep networks. Other technical benefits can be realized through implementations of the disclosed technologies.

In order to provide the technical benefits mentioned above, and potentially others, a schedule builder performs an analysis of a DNN computation graph for a DNN to identify and select data structures used during training of the DNN. The selection of the data structures can be based on the layer pairs specified in the DNN computation graph.

Based upon the analysis, the schedule builder creates a modified DNN computation graph by adding nodes to the original DNN computation graph. The newly added nodes can define functions for encoding data structures during a forward training pass of the DNN. The new nodes can also define decode functions for decoding the previously-encoded data structures during a backward training pass of the DNN. The functions added to the DNN computation graph can be selected based upon on the specific layer pairs specified in the DNN computation graph.

Once the modified DNN computation graph has been generated, the DNN can be trained using the modified DNN computation graph. The inclusion of the functions in the modified DNN computation graph can reduce the utilization of memory during training of the DNN.

When a DNN computation graph defines a DNN that includes a layer pair having a rectified linear unit ("ReLU") layer and a pooling layer, a node defining an encode function can be added to the DNN computation graph for generating a positive value map ("PVM") during a forward training pass of the DNN. The PVM indicates whether values in an input feature map to the ReLU layer of the DNN were positive. The ReLU layer can be modified to operate directly on the PVM during the backward training pass of the DNN.

When a DNN computation graph defines a layer pair that includes a ReLU layer and a pooling layer, a node for generating a data structure (which might be referred to herein as a "Y2-to-X2 mapping") during the forward training pass of the DNN can be added to the DNN computation graph. The Y2-to-X2 mapping defines a mapping between an input feature map to the pooling layer and an output feature map generated by the pooling layer. The max pooling layer can be modified to operate directly on the Y2-to-X2 mapping during the backward training pass of the DNN.

When a DNN computation graph defines a DNN that includes a layer pair having a ReLU layer and a convolution layer, a node is added to the DNN computation graph that generates a memory-efficient sparse representation of the output feature map generated by the ReLU layer during the forward training pass of the DNN. The output feature map of the ReLU layer is also the input feature map to the convolution layer. Nodes are also added to the DNN computation graph for performing backward pass computations utilizing the output and input feature maps in their original dense format, thereby retaining the performance benefits of highly optimized dense computation, while exploiting sparsity to achieve high reduction in memory footprint.

When a DNN computation graph defines a DNN that includes a layer pair having a max pooling layer and a convolution layer, a node is added to the DNN computation graph that generates a memory-efficient sparse representation of the output feature map generated by the max pooling layer during the forward training pass of the DNN. The output feature map of the max poling layer is also the input feature map to the convolution layer. Nodes are also added to the DNN computation graph for performing backward pass computations utilizing the output and input feature maps in their original dense format, thereby retaining the performance benefits of highly optimized dense computation, while exploiting sparsity to achieve high reduction in memory footprint.

In some configurations, nodes can be added to a DNN computation graph for reducing the precision of feature maps after they are no longer needed during a forward training pass of the DNN. For example, and without limitation, the precision of input feature maps and output feature maps can be reduced after they are no longer needed during a forward training pass. The reduced precision feature maps can be utilized during the backward training pass rather than the original feature maps. This enables the memory utilized to store the original feature maps to be freed after the feature maps have been utilized during the forward pass, thereby saving memory. This mechanism might be referred to herein as Delayed Precision Reduction ("DPR").

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
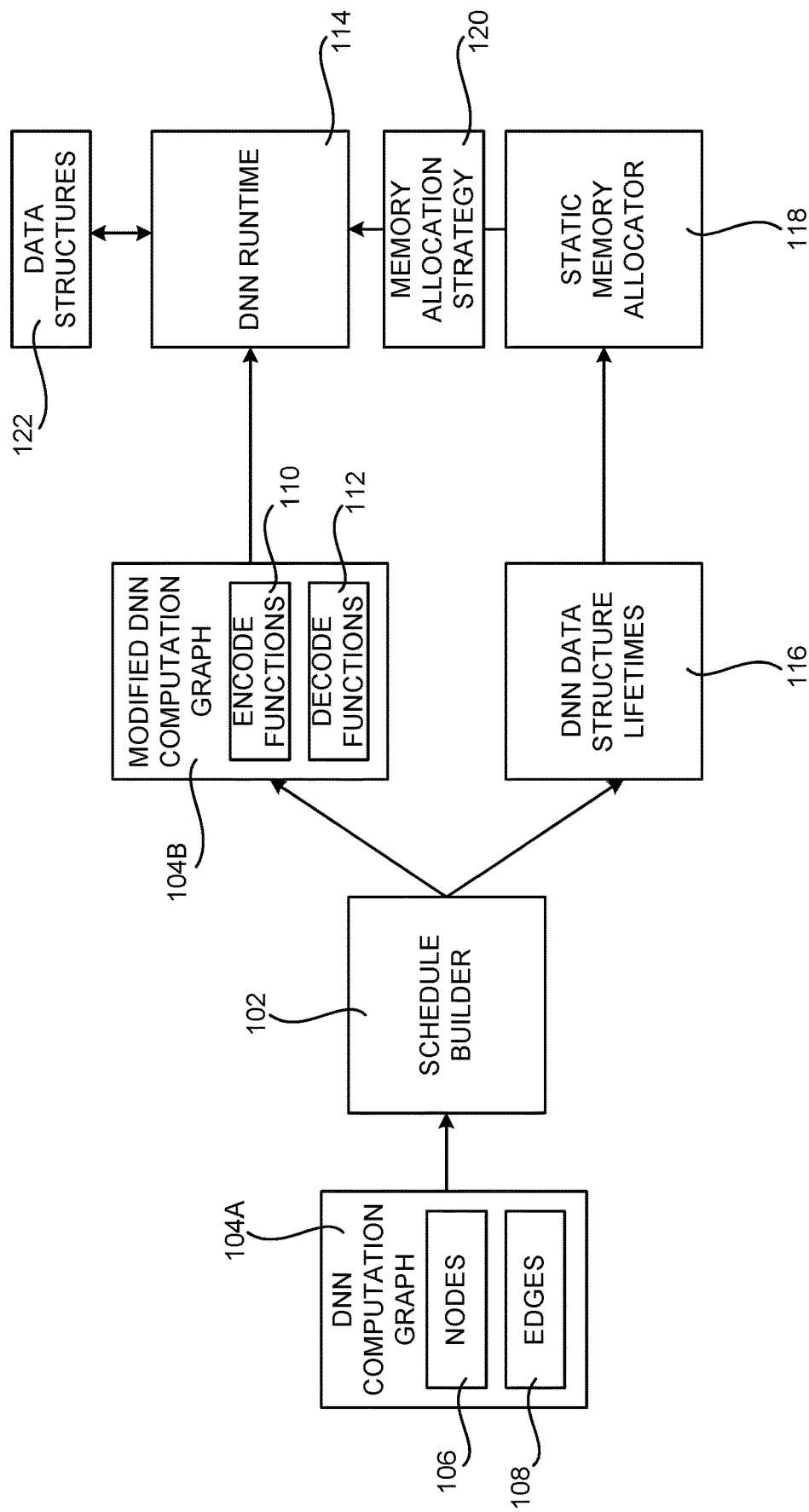
FIG. 1 is a computing architecture diagram that shows aspects of the configuration of one system disclosed herein for efficient data encoding for deep neural network training.

The following detailed description is directed to technologies for efficient data encoding for deep neural network training. In addition to other technical benefits, the disclosed technologies can reduce memory utilization during training of DNNs with minimal impact on performance. By reducing the memory footprint of DNNs during training, the disclosed technologies enable larger amounts of training data to be stored in memory for use in training very deep networks. Other technical benefits not specifically identified herein can also be realized through implementations of the disclosed technologies.

Prior to describing the disclosed technologies for efficient data encoding for deep neural network training, a brief overview of DNNs and DNN training will be provided. A DNN generally consists of a sequence of layers of different types (e.g. convolution, ReLU, fully connected, and pooling layers). DNNs are typically trained using a labeled dataset (e.g. a set of images that have been labeled with data describing the content in the images). DNN training commonly utilizes GPUs as the compute platform.

A DNN is trained across multiple epochs. In each epoch, the DNN trains over all of the training data in a training dataset in multiple steps. In each step, the DNN first makes a prediction for a subset of the training data, which might be referred to herein as a "minibatch" or a "batch." Training on minibatches as opposed to training on individual instances of training data (e.g. individual images) has been shown to achieve better accuracy and better hardware utilization. This step is commonly referred to as a "forward pass" (which might also be referred to herein as a "forward training pass").

To make a prediction, input data from a minibatch is fed to the first layer of the DNN, which is commonly referred to as an "input layer." Each layer of the DNN then computes a function over its inputs, often using learned parameters, or "weights," to produce an input for the next layer. The output of the last layer, commonly referred to as the "output layer," is a class prediction. Based on the label predicted by the DNN and the actual label of each instance of training data, the output layer computes a "loss," or error function.

In a "backward pass" (which might also be referred to herein as a "backward training pass") of the DNN, each layer of the DNN computes the error for the previous layer and the gradients, or updates, to the weights of the layer that move the DNN's prediction toward the desired output. The result of training a DNN is a set of weights, or "kernels," that represent a transform function that can be applied to an input with the result being a classification, or semantically labeled output.

The DNN training process described above has large compute and memory requirements. A large part of the memory required during DNN training is taken up by data structures (e.g., weights that change over the course of training, weight gradients, intermediate layer outputs or "feature maps" that need to be stored during a forward pass for use in the corresponding backward pass, and backward gradient maps). As DNNs have grown larger and deeper, the size of these data structures has increased significantly. As a result, GPU main memory has become a significant bottleneck. This bottleneck limits the size of DNNs that can be trained and, as a result, limits DNNs from solving even more complex problems. The technologies disclosed herein address these and potentially other considerations.

Referring now to the drawings, in which like numerals represent like elements throughout the several FIGS., aspects of various technologies for efficient data encoding for deep neural network training will be described. In the following detailed description, references are made to the accompanying drawings that form a part hereof, and which are shown by way of illustration specific configurations or examples.

FIG. 1 is a computing architecture diagram that shows aspects of the configuration of one system disclosed herein for efficient data encoding for deep neural network training. In one configuration, a DNN computation graph 104A is utilized that includes nodes 106 and edges 108 that define a DNN. Other representations of a DNN can be utilized in other configurations.

The DNN computation graph 104A is provided to a schedule builder 102. The schedule builder 102 is a software or hardware component that performs a static analysis of the DNN computation graph 104A for a DNN to identify and select data structures 122 used during training of the DNN. As will be described in greater detail below, the selection of the data structures 122 can be based on the layer pairs (i.e. two adjacent layers of the DNN) defined by the DNN computation graph 104A.

Based upon the analysis, the schedule builder 102 creates a modified DNN computation graph 104B by adding nodes 106, or other types of data, to the original DNN computation graph 104A. The newly added nodes 106 can define encode functions 110 for encoding data structures 122 during a forward training pass of the DNN. The new nodes 106 can also define decode functions 112 for decoding the previously-encoded data structures 122 during a backward training pass of the DNN. The functions added to the DNN computation graph 104A to create the modified DNN computation graph 104B can be selected based upon the specific layer pairs defined by the DNN computation graph 104A.

The schedule builder 102 also performs a static liveness analysis for the affected feature maps that are stored during training of the DNN defined by the DNN computation graph 104A and the encoded/decoded representations of the feature maps generated by the encode functions 110 and decode functions 112. The static liveliness analysis performed by the schedule builder 102 can identify the lifetimes (i.e. the amount of time from when a data structure 122 is created and the time at which it is destroyed) of the data structures 122 used during training of the DNN. The schedule builder 102 passes data 116 identifying the DNN data structure lifetimes 116 to a static memory allocator 118.

The static memory allocator 118 is a software or hardware component that utilizes the data 116 defining the DNN data structure lifetimes and data identifying the sizes of the data structures to generate an efficient memory allocation strategy 120 for use by the DNN runtime 114 that trains the DNN. In one configuration, the static memory allocator 118 creates groups of data structures 122 whose lifetimes do not overlap during DNN training and, therefore, can share the same memory space. The amount of memory required by the data structures in each group is the size of the largest member within the group. The static memory allocator 118 sorts the data structures 122 on the basis of size, and then forms the groups, so that larger data structures can share the same memory space.

At the end of the process described above, the static memory allocator 118 has identified multiple groups of data structures 122 used during training of a DNN that are either dominated by feature maps that are stored for the backward training pass of the DNN or by immediately consumed feature maps or gradient maps. As will be discussed in greater detail below, reducing the lifetimes of feature maps that are stored during a forward training pass for use during a backward training pass creates opportunities for memory sharing, which results in a smaller memory footprint during DNN training.

Once the modified DNN computation graph 104B and the memory allocation strategy 120 have been generated and provided to the DNN runtime 114, the DNN defined by the modified DNN computation graph 104B can be trained. The inclusion of encode functions 110 and decode functions 112 in the modified DNN computation graph 104A can reduce the utilization of memory during training of the DNN. Additional details regarding this process will be provided below.

Figure 2:
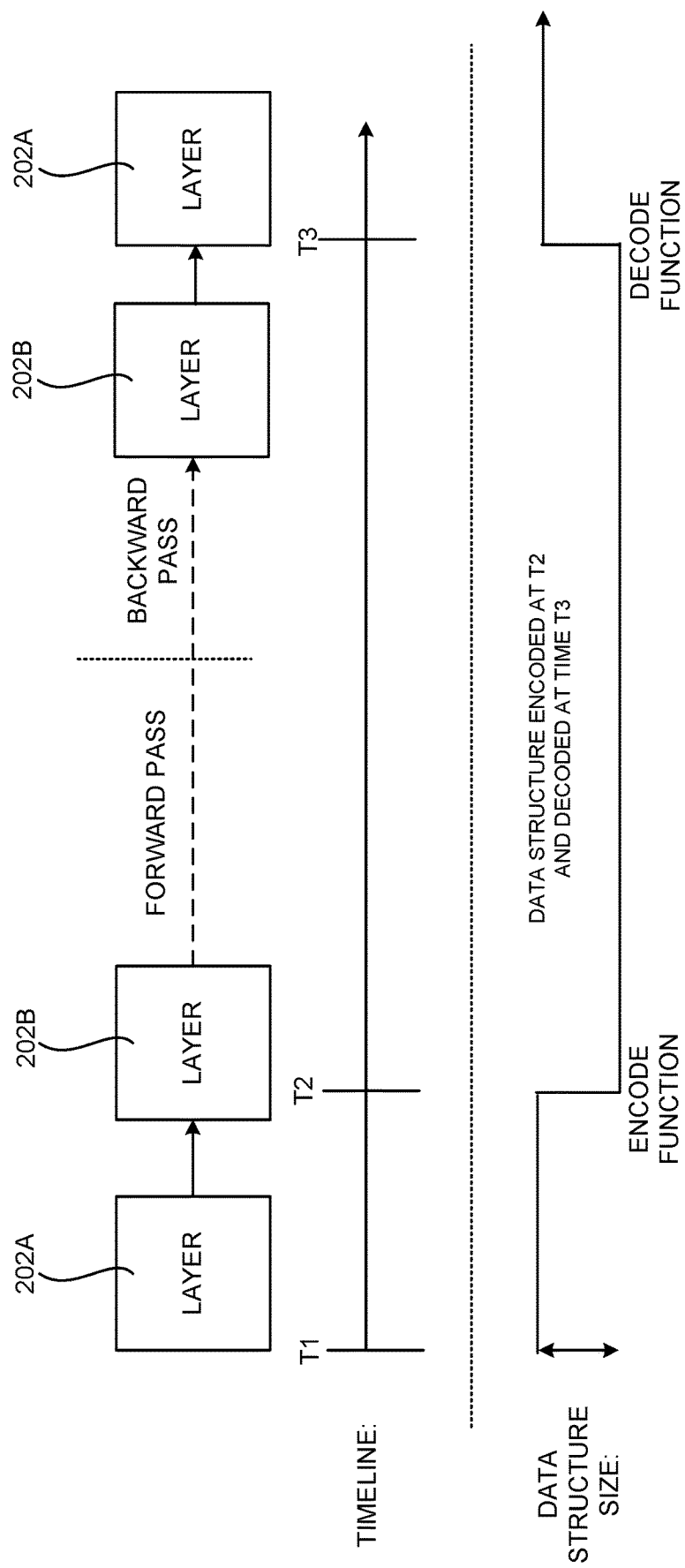
FIG. 2 is a timing diagram illustrating how memory utilization during DNN training can be reduced using an implementation of the disclosed technologies.

FIG. 2 is a timing diagram illustrating how memory utilization during DNN training can be reduced using an implementation of the disclosed technologies. In the example shown in FIG. 2, a DNN includes at least two layers 202A and 202B. A forward training pas of the DNN begins at time T1, and a data structure 122 (e.g. an output feature map) is generated by layer 202A at time T2. The data structure 122 is then stored in memory for use during a backward training pass. The data structure 122 is not, however, utilized again until time T3 during the backward training pass. As a result, memory is utilized for storing the data structure 122 from time T2 until time T3 even though the data structure 122 is not used during that time period.

Using the disclosed technologies, the amount of memory utilized between time T2 and time T3 can be reduced and utilized to store other data structures. In particular, the data structure 122 can be retained in its original format as long as it is needed for the immediate forward use. The data structure 122 can then be encoded and stored for use during the backward training pass of the DNN. The original data structure 122 can be discarded. The encoded data structure can then be decoded when it is needed for the backward training pass (i.e. at time T3 in the example shown in FIG. 2).

As will be described in greater detail below, data structures 122 utilized during training of a DNN, such as input and output features maps, can be stored using efficient encodings between the time they are no longer needed during the forward training pass until the time they are needed during the backward training pass. Moreover, if layer types and interactions are considered, highly efficient layer-specific encodings can be utilized, thereby saving additional memory during DNN training. Two example layer-specific lossless encoding functions and one lossy encoding function that are fast, efficient in reducing memory footprint during training of a DNN, and that have minimal effect on DNN training accuracy are described in greater detail below with regard to FIGS. 3A-3E.

Figure 3A:
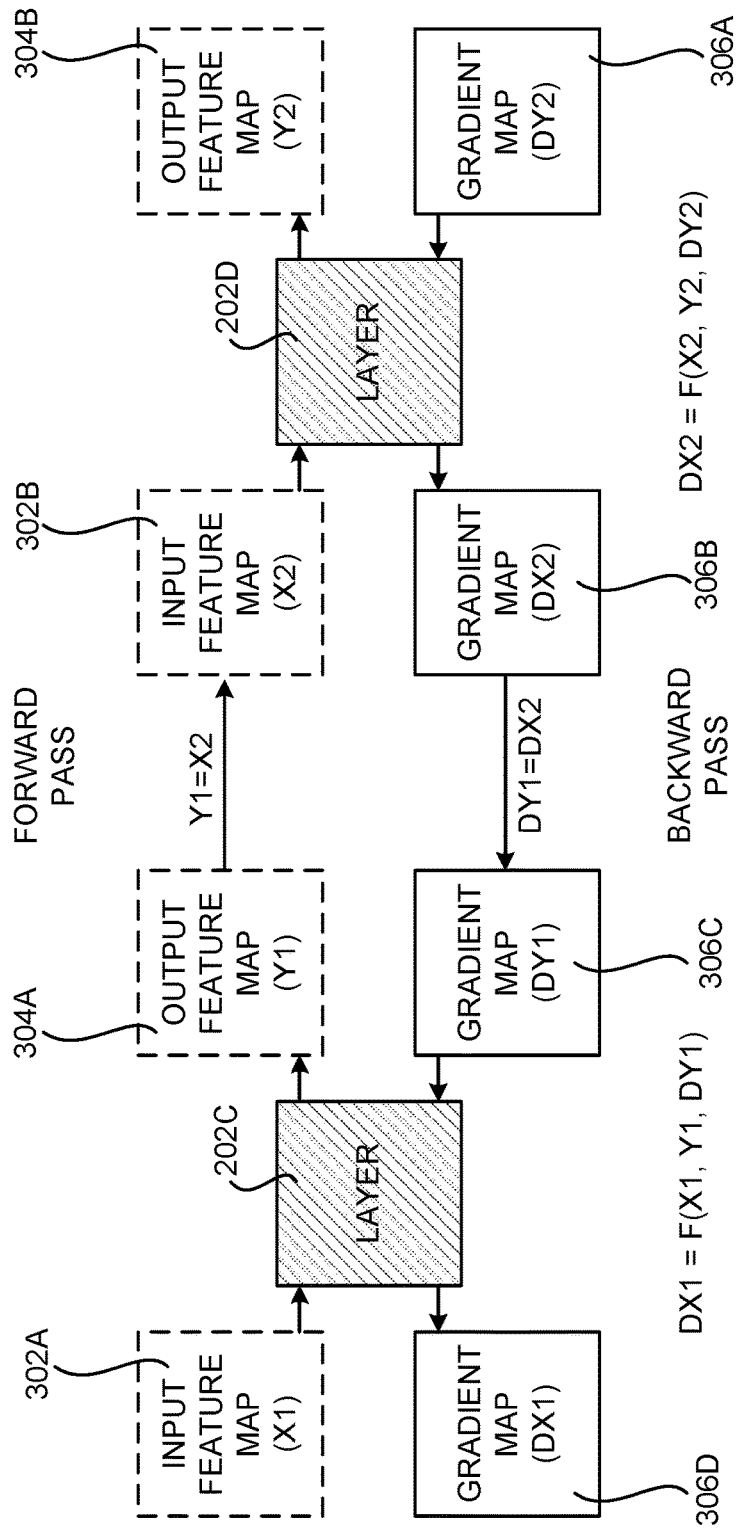
FIGS. 3A-3E are DNN layer diagrams illustrating aspects of several mechanisms disclosed herein for reducing memory utilization during DNN training.

FIG. 3A is a DNN layer diagram showing aspects of the utilization of data structures 122 during typical DNN training. In the example shown in FIG. 3A, a layer 202C of a DNN can take an input feature map 302A as input during a forward training pass of the DNN.

The layer 202C can perform its assigned function (e.g. ReLU or convolution) and generate an output feature map 304A. The output feature map 304A is then provided to the layer 202D as its input during the forward training pass. In this regard, it is to be appreciated that the output feature map 304A and the input feature map 302B are equivalent. The layer 202D performs its assigned function to generate the output feature map 304B.

During the backward training pass of the example DNN illustrated in FIG. 3A, the layer 202D generates and stores the gradient map 306B. The gradient map 306B is a function of the input feature map 302B (X2), the output feature map 304B (Y2), and the gradient map 306A (DY2) generated by the next layer in the DNN (i.e. DX2=F (X2, Y2, DY2)). In order to generate the gradient map 306B, therefore, the input feature map 302B and the output feature map 304B are traditionally stored in GPU memory from the time they are created during the forward pass until they are utilized by the layer 202D during the backward pass.

The layer 202D provides the gradient map 306B (DX2), which is equivalent to the gradient map 306C (DY1), to the layer 202C. The layer 202C then utilizes the input feature map 302A (X1), the output feature map 304A (Y1), and the gradient map 306C (DY1) to generate the gradient map 306D (DX1) (i.e. DX1=F (X1, Y1, DY1)). The input feature map 302A and the output feature map 304A are, therefore, traditionally stored in GPU memory from the time they are generated during the forward training pass until the time they are consumed by the layer 202C. Using the technologies disclosed herein, the amount of memory needed to store these data structures during their two temporal uses (i.e. during the forward pass and the backward pass) is reduced. Additional details regarding this process are provided below.

Figure 3B:
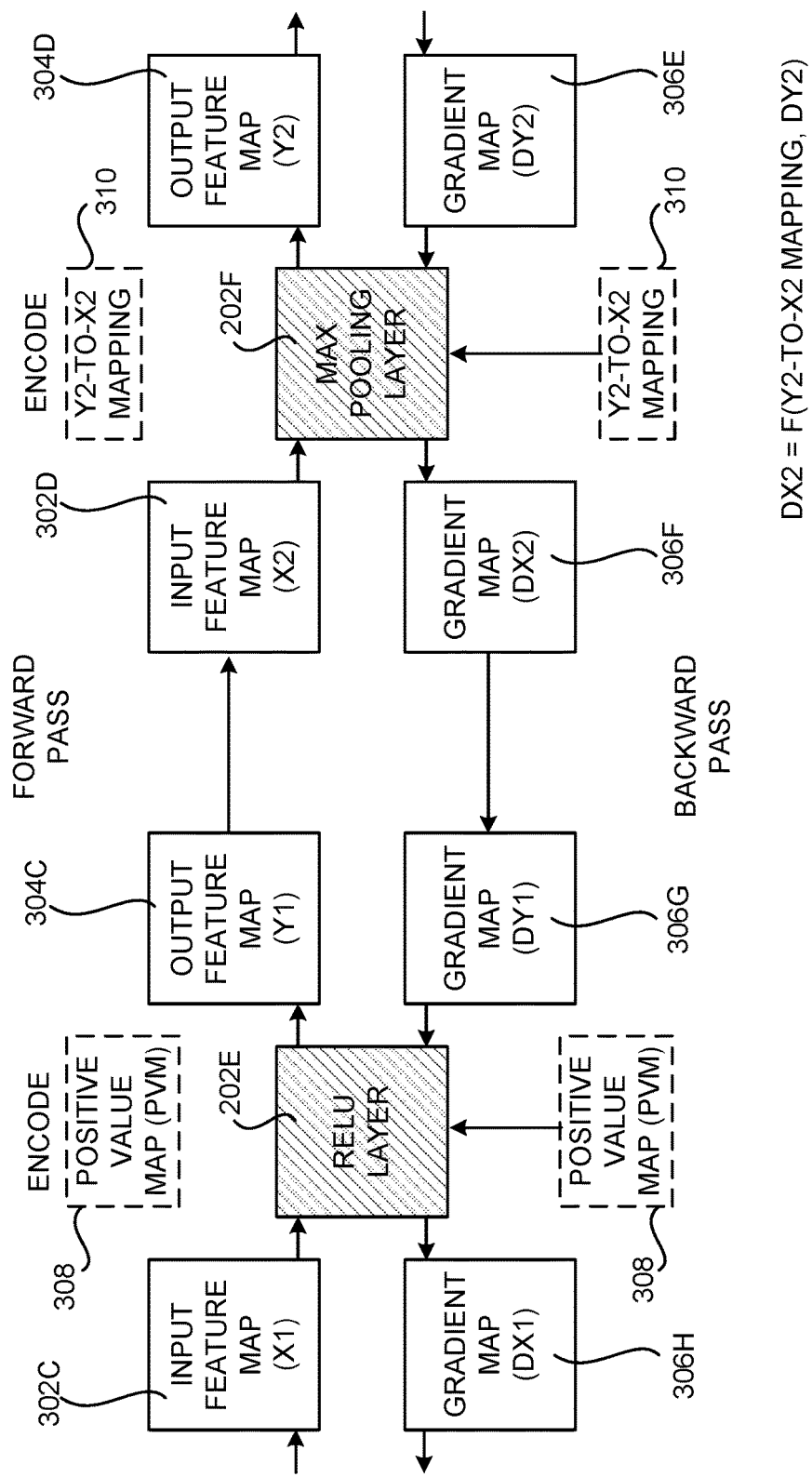

FIG. 3B shows one example of layer-specific encoding and decoding of data structures 122 during training of a DNN. In this example, a DNN computation graph 104A defines a DNN having a layer pair that includes a ReLU layer 202E and a max pooling layer 202F. In a traditional implementation, the ReLU layer 202E stores the input feature map 302C and the output feature map 304C during the forward training pass to find the location of maximum values during the backward pass.

In order to reduce the memory consumption during DNN training by a ReLU/max pooling layer pair, such as that shown in FIG. 3B, a node 106 defining an encode function 110 can be added to the DNN computation graph 104A for generating a positive value map ("PVM") 308 during a forward training pass of the DNN. The PVM 308 indicates whether values in an input feature map 302C to the ReLU layer of the DNN were positive.

The PVM 308 can be implemented as a data structure storing one bit per entry in the input feature map 302C indicating whether each entry was positive. A node 106 defining a decode function 112 can also be added to the DNN computation graph 104A to enable utilization of the PVM 308 by the ReLU layer 202E during the backward training pass of the DNN (i.e. DX1=F (PVM, DY1)). Consequently, the input feature map 302C and the output feature map 304C can be discarded after they are utilized in the forward training pass.

When a DNN computation graph defines a layer pair that includes a ReLU layer and a max pooling layer, such as that shown in FIG. 3B, a node 106 defining an encode function 110 for generating a data structure 310 (which might be referred to herein as a "Y2-to-X2 mapping 310") during the forward training pass of the DNN can also be added to the DNN computation graph 104A.

The Y2-to-X2 mapping 310 defines a mapping between an input feature map 302D to the max pooling layer 202F and an output feature map 304D generated by the max pooling layer 202F. In one configuration, the Y2-to-X2 mapping 310 has as many elements as the output feature map 304D, where each element is stored using 4 bits. The max pooling layer 203F can compute the gradient map 306F (DX2) using the Y2-to-X2 mapping 310 and the gradient map 306E (DY2) (i.e. DX2=F (Y2-to-X2 mapping, DY2)).

Storage and utilization of the Y2-to-X2 mapping 310 eliminates the dependence of the max pooling layer 202F on its input feature map 302D and its output feature map 304D during the backward training pass, and these data structures can therefore be discarded after they have been consumed during the forward training pass. The ReLU layer 202E and the max pooling layer 202F can be modified to operate directly on the PVM 308 and the Y2-to-X2 mapping 310, respectively, during the backward training pass of the DNN.

Figure 3C:
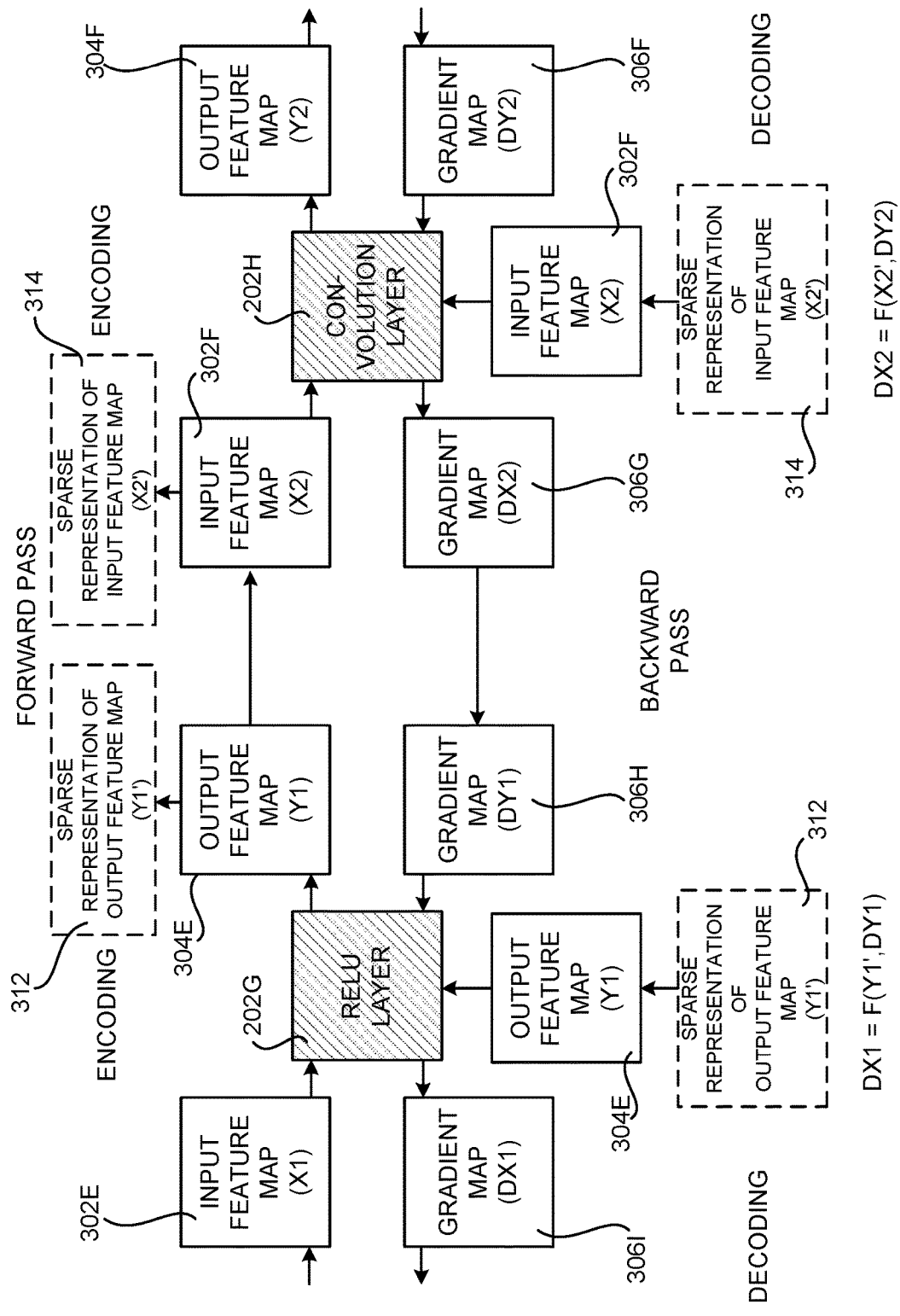
Figure 3D:
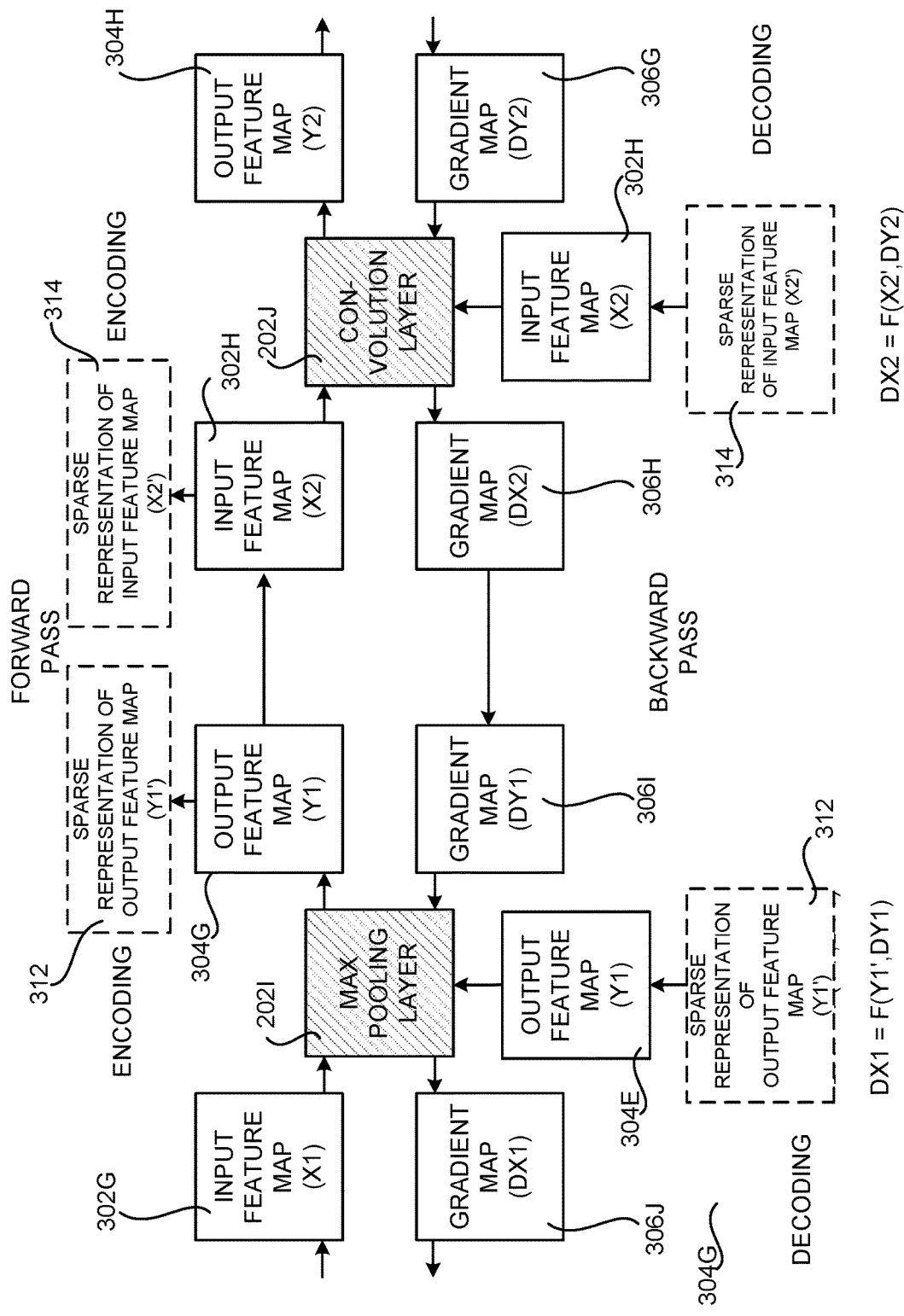

FIGS. 3C and 3D show several additional examples of layer-specific encoding and decoding of data structures 122 during training of a DNN. In the examples shown in FIGS. 3C and 3D, sparse storage and dense compute ("SSDC") encoding is utilized. SSDC isolates computation and storage, facilitating storage of data structures in a sparse format and computation on the data structures in a dense format. As will be described in greater detail below, SSDC stores data structures in a sparse format for the majority of their lifetimes and converts the data structures back into dense format just before they are needed for computation. This mechanism can achieve significant memory footprint reduction, while retaining the performance benefits of highly optimized DNN runtimes.

In the example shown in FIG. 3C, for instance, a DNN computation graph 104A defines a DNN that includes a layer pair having a ReLU layer 202G and a convolution layer 202H. In this configuration, a node 106 can be added to the DNN computation graph 104A for an encoding function 110 that generates a memory-efficient sparse representation 312 (Y1') of the output feature map 304E (Y1) generated by the ReLU layer 202G during the forward training pass of the DNN. As mentioned above, the output feature map 304E of the ReLU layer is the same as the input feature map 302F to the convolution layer. A memory-efficient sparse representation 314 (X2') of the input feature map 302F is illustrated in FIG. 3C for clarity. However, it is to be appreciated that the sparse representation 312 and the sparse representation 314 are the same and, therefore, only one sparse representation is computed and stored during the forward training pass.

Nodes are also added to the DNN computation graph 104A for performing backward pass computations utilizing the output feature map 304E (Y1) and input feature map 302F (X2) in their original dense format, thereby retaining the performance benefits of highly optimized dense computation, while exploiting sparsity to achieve high reduction in memory footprint. For example, and as shown in FIG. 3C, the sparse representation 314 can be converted back to the dense input feature map 302F for use by the convolution layer 202H during the backward training pass. Similarly, the sparse representation 312 can be converted to the original dense output feature map 304E prior to utilization by the ReLU layer 202G during the backward pass. In other configurations, the ReLU layer 202G and the convolution layer 202H operate directly on the sparse representations 312 and 314, respectively (i.e. DX1=F (Y1', DY1) and DX2=F (X2', DY2)).

In the example shown in FIG. 3D, a DNN computation graph 104A defines a DNN that includes a layer pair having a max pooling layer 202I and a convolution layer 202J. In this configuration, a node 106 can be added to the DNN computation graph 104A for an encoding function 110 that generates a memory-efficient sparse representation 312 (Y1') of the output feature map 304G (Y1) generated by the max pooling layer 202I during the forward training pass of the DNN. As in the examples described above, the output feature map 304G of the max pooling layer 202I is the same as the input feature map 302H to the convolution layer 202J. A memory-efficient sparse representation 314 (X2') of the input feature map 302H is illustrated in FIG. 3D for clarity. However, it is to be appreciated that the sparse representation 312 and the sparse representation 314 are the same and, therefore, only one sparse representation is computed and stored during the forward training pass.

Nodes are also added to the DNN computation graph 104A for performing backward pass computations utilizing the output feature map 304G (Y1) and the input feature map 302H (X2) in their original dense format, thereby retaining the performance benefits of highly optimized dense computation, while exploiting sparsity to achieve high reduction in memory footprint. For example, and as shown in FIG. 3D, the sparse representation 314 (X2') can be converted back to the dense input feature map 302H for use by the convolution layer 202J during the backward training pass. Similarly, the sparse representation 312 can be converted to the original dense output feature map 304G prior to utilization by the max pooling layer 202I during the backward pass. In other configurations, the max pooling layer 202I and the convolution layer 202J operate directly on the sparse representations 312 and 314, respectively (i.e. DX1=F (Y1', DY1) and DX2=F (X2', DY2)).

A Compressed Sparse Row ("CSR") format is utilized to store the sparse representations 312 and 314 in some configurations. This format stores the non-zero values of the respective feature map, along with a meta array that holds the column indices of the non-zero values in each row. The two-dimensional ("2D") data structures commonly utilized by DNN frameworks can be converted into the CSR format. Narrow Value Optimization ("NVR") can also be performed in some configurations, where the 2D matrix described above is reshaped and the number of columns is restricted to 256, thereby requiring only 1 byte per column index. This can reduce the minimal sparsity requirement for compression to be effective from 50% to 20%, resulting in both wider applicability and higher compression ratios.

Figure 3E:
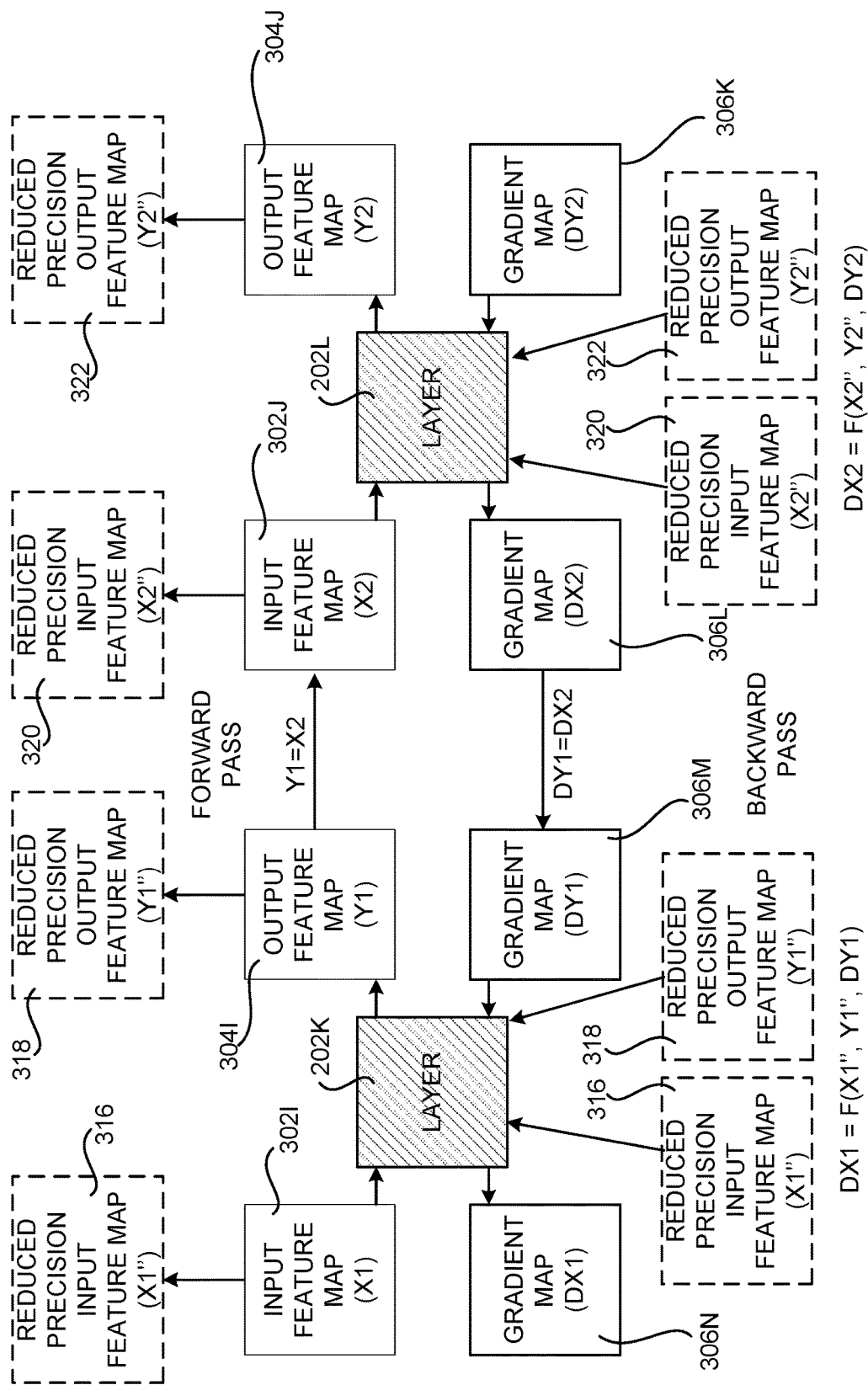

In some configurations, such as that shown in FIG. 3E, nodes can be added to a DNN computation graph 104A for reducing the mathematical precision of feature maps after they have been consumed during a forward training pass of the DNN. For example, and without limitation, the mathematical precision of input feature maps and output feature maps can be reduced after they are no longer needed during a forward training pass. Because precision reduction is delayed until feature maps have been consumed in the forward training pass, this mechanism might be referred to herein as Delayed Precision Reduction ("DPR"). DPR allows the GPU memory utilized to store the original feature maps to be freed after the feature maps have been utilized during the forward pass, thereby saving memory.

In the example shown in FIG. 3E, the input feature map 302I has been converted to the reduced precision input feature map 316 (X1"). Similarly, the output feature map 304I has been converted to the reduced precision output feature map 318 (Y1"). The reduced precision input feature map 316 and the reduced precision output feature map 318 can be utilized during the backward training pass to compute the gradient map 306N (i.e. DX1=F (X1", Y1", DY1)).

In the example shown in FIG. 3E, the input feature map 302J has been converted to the reduced precision input feature map 320 (X2"). Similarly, the output feature map 304J has been converted to the reduced precision output feature map 322 (Y2"). The reduced precision input feature map 320 and the reduced precision output feature map 322 can be utilized during the backward training pass to compute the gradient map 306N (i.e. DX2=F (X2", Y2", DY2)).

It is to be appreciated that the reduced precision feature maps are utilized directly during the backward training pass rather than the original feature maps in the example shown in FIG. 3E. In other configurations, however, the reduced precision feature maps are converted back to their higher precision representations prior to use during the backward training pass. It is also to be appreciated that DPR is applicable to any layer combination. DPR can also be applied in addition to SSDC encoding described above thereby compressing the non-zero values array in the CSR format.

In some configurations, three smaller representations of 16, 10 and 8 bits are utilized, to pack 2, 3 and 4 values, respectively, into 4 bytes. For packing 3 values into 4 bytes, 10 bits is the largest length possible (9 bits leave 5 bits unused, 11 bits requires one extra bit). For 16 bits, IEEE half precision floating point format can be utilized (1 sign, 5 exponent and 10 mantissa bits), which might be referred to as "FP16." For 8-bits ("FP8"), 1 bit for sign, 4 for exponent and 3 for mantissa can be utilized, and for 10-bits ("FP10"), 1 sign, 5 exponent and 4 mantissa bits can be utilized. In FP10, three 10-bit values can be stored in a 4-byte space, thereby rendering 2-bits unneeded. Denormalized numbers can also be ignored as they have a negligible effect on accuracy of a DNN. A round-to-nearest rounding strategy for these conversions can be utilized. Since conversions can happen in parallel, DPR results in minimal performance overhead.

Figure 4:
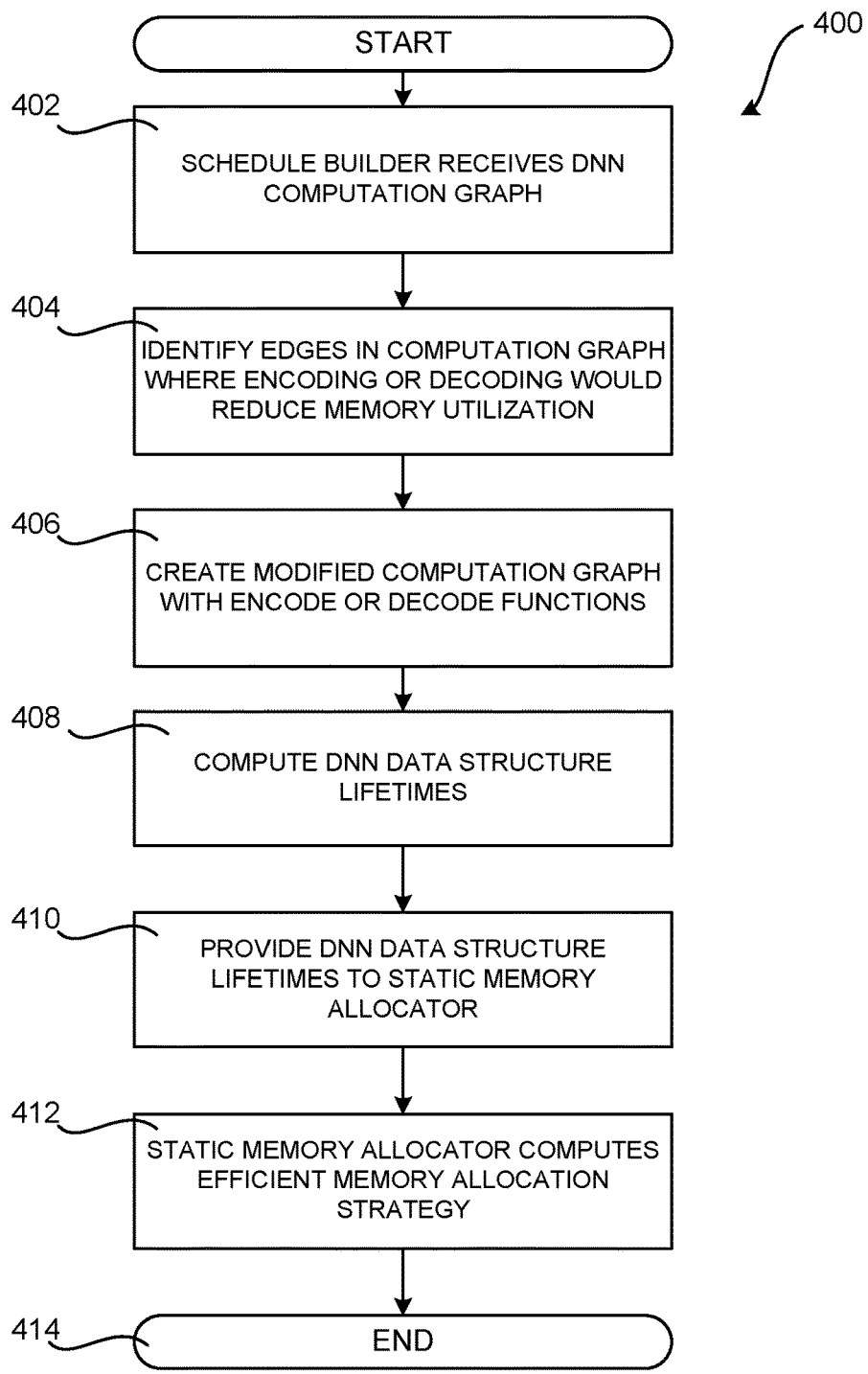
FIG. 4 is a flow diagram showing a routine that illustrates aspects of an illustrative computer-implemented process for efficient data encoding for deep neural network training.

Referring now to FIG. 4, a flow diagram showing a routine 400 will be described that shows aspects of an illustrative computer-implemented process for efficient data encoding for DNN training. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where the schedule builder 102 receives a DNN computation graph 104A. The routine 400 then proceeds to operation 404, where the DNN computation graph 104A identifies edges in the DNN computation graph 104A where encoding and decoding would reduce memory utilization. The routine 400 then proceeds from operation 404 to operation 406.

At operation 406, the schedule builder 102 generates a modified computation graph 104B with encoding functions and decoding functions for reducing memory utilization. The routine 400 then proceeds to operation 408, where the schedule builder 102 computes the DNN data structure lifetimes in the manner described above. Data 116 describing the DNN data structure lifetimes is then provided to the static memory allocator 118 at operation 410.

The routine 400 then proceeds from operation 410 to operation 412, where the static memory allocator 118 computes a memory allocation strategy 120 to be used by the DNN runtime 114. Once the memory allocation strategy 120 has been computed, the DNN runtime 114 can utilize the modified DNN computation graph 104B and the memory allocation strategy 120 to train the DNN. The routine 400 then proceeds from operation 412 to operation 414, where it ends.

Figure 5:
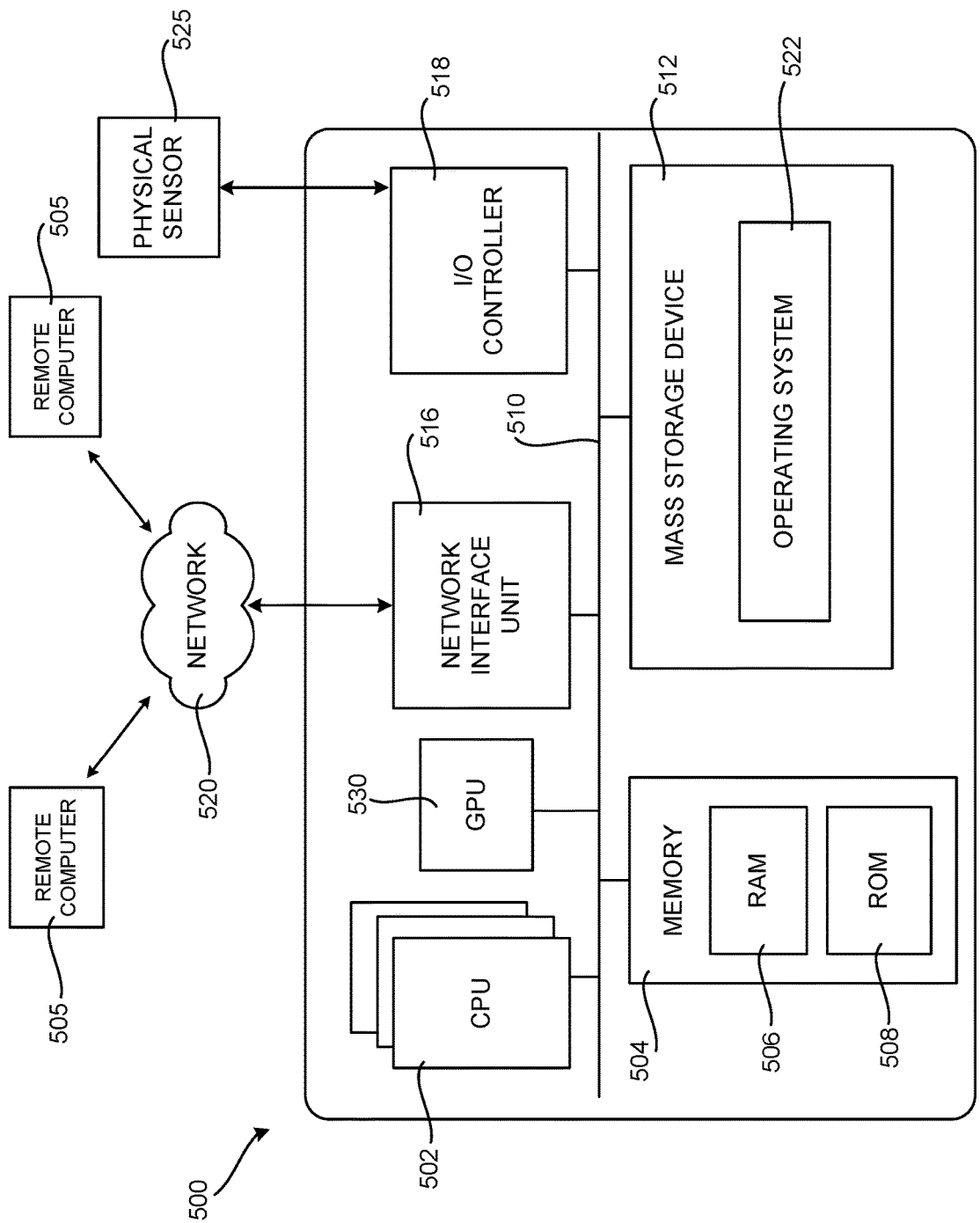
FIG. 5 is a computer architecture diagram showing an illustrative computer hardware and software architecture for a computing device that can implement aspects of the technologies presented herein.

FIG. 5 is a computer architecture diagram showing an illustrative computer hardware and software architecture for a computing device that can implement the various technologies presented herein. In particular, the architecture illustrated in FIG. 5 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing training of a DNN, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

The computer 500 illustrated in FIG. 5 includes one or more central processing units 502 ("CPU"), one or more GPUs 530, a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing an operating system 522, application programs, and other types of programs. The mass storage device 512 can also be configured to store other types of programs and data, such the DNN computation graph 104A, the schedule builder 102, the modified DNN computation graph 104B, the DNN data structure lifetimes 116, the static memory allocator 118, the memory allocation strategy 120, the DNN runtime 114, and the data structures 122.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
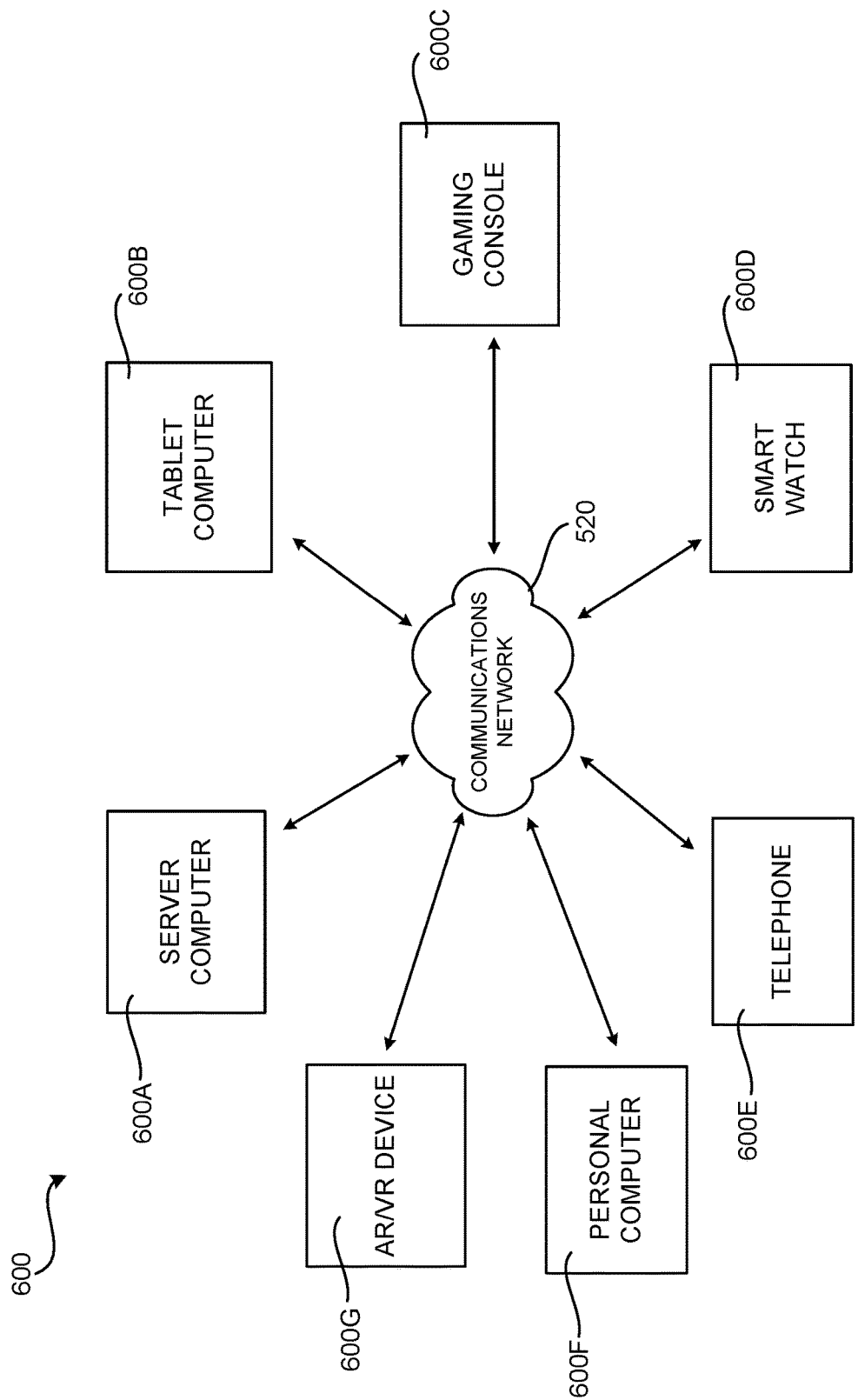
FIG. 6 is a network diagram illustrating a distributed computing environment in which aspects of the disclosed technologies can be implemented.

FIG. 6 is a network diagram illustrating a distributed network computing environment 600 in which aspects of the disclosed technologies can be implemented, according to various configurations presented herein. As shown in FIG. 6, one or more server computers 600A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 600B, a gaming console 600C, a smart watch 600D, a telephone 600E, such as a smartphone, a personal computer 600F, and an AR/VR device 600G.

In a network environment in which the communications network 520 is the Internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G can be equipped with an operating system operable to support one or more computing applications or terminal sessions such as a web browser (not shown in FIG. 6), or other graphical user interface (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over an exemplary communications network 520. A participating user (not shown in FIG. 6) may request access to specific data and applications housed in whole or in part on the server computer 600A. These data may be communicated between the client computing devices 600B-600G and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

EXAMPLE A

A computer-implemented method, comprising: performing an analysis of a DNN computation graph for a DNN to identify one or more data structures created during training of the DNN; selecting a data structure from the one or more data structures to be encoded during training of the DNN based on the analysis; creating a modified DNN computation graph by adding at least one node to the DNN computation graph, the at least one node defining an encode function for encoding the selected data structure during a forward pass of the DNN while training the DNN; and causing the DNN to be trained using the modified DNN computation graph.

EXAMPLE B

The computer-implemented method of example A, wherein the selected data structure and the encode function are selected based upon layers in a layer pair of the DNN.

EXAMPLE C

The computer-implemented method of any of examples A-B, wherein a first layer of the layer pair comprises a rectified linear unit (ReLU) layer, and wherein a second layer of the layer pair comprises a pooling layer.

EXAMPLE D

The computer-implemented method of any of examples A-C, wherein the selected data structure comprises a positive value map (PVM) indicating whether values in an input feature map to the ReLU layer of the DNN were positive.

EXAMPLE E

The computer-implemented method of any of examples A-D, wherein the selected data structure comprises a mapping between an output feature map generated by the pooling layer and an input feature map to the pooling layer.

EXAMPLE F

The computer-implemented method of any of examples A-E, wherein creating the modified DNN further comprises adding at least one node defining a decode function for decoding the selected data structure during a backward pass of the DNN while training the DNN.

EXAMPLE G

The computer-implemented method of any of examples A-F, wherein a first layer of the layer pair comprises a rectified linear unit (ReLU) layer, and wherein a second layer of the layer pair comprises a convolution layer.

EXAMPLE H

The computer-implemented method of any of examples A-G, wherein the selected data structure comprises an output feature map generated by the ReLU layer.

EXAMPLE I

The computer-implemented method of any of examples A-H, wherein the selected data structure comprises an input feature map consumed by the convolution layer.

EXAMPLE J

The computer-implemented method of any of examples A-I, wherein the selected data structure comprises an input feature map to a layer of the DNN, and wherein the encode function causes a precision of the input feature map to be reduced during training of the DNN.

EXAMPLE K

The computer-implemented method of any of examples A-J, wherein the selected data structure comprises an output feature map generated by a layer of the DNN, and wherein the encode function causes a precision of the input feature map to be reduced during training of the DNN.

EXAMPLE L

A computing device, comprising: one or more processors; and at least one computer storage media having computer-executable instructions stored thereupon which, when executed by the one or more processors, will cause the computing device to: execute a schedule builder prior to training a DNN, the schedule builder configured to analyze a DNN computation graph for the DNN to select a data structure to be encoded during the training of the DNN based upon layers in a layer pair of the DNN, create a modified DNN computation graph by adding at least one encode function for encoding the selected data structure during a forward training pass of the DNN, and determine a lifetime of the selected data structure during the training of the DNN; execute a static memory allocator prior to training the DNN, the static memory allocator configured to generate a memory allocation strategy based upon the lifetime of the selected data structure; and train the DNN using the modified DNN computation graph, wherein the memory allocation strategy is utilized during the training of the DNN to allocate and deallocate memory for storing the selected data structure.

EXAMPLE M

The computing device of example L, wherein a first layer of the layer pair comprises a rectified linear unit (ReLU) layer, and wherein a second layer of the layer pair comprises a pooling layer.

EXAMPLE N

The computing device of any of examples L-M, wherein a first layer of the layer pair comprises a rectified linear unit (ReLU) layer, and wherein a second layer of the layer pair comprises a convolution layer.

EXAMPLE O

The computing device of any of examples L-N, wherein the selected data structure comprises an input feature map to a layer of the DNN, and wherein the encode function causes a precision of an input feature map or an output feature map to be reduced during the training of the DNN.

EXAMPLE P

A computer storage media having computer-executable instructions stored thereupon which, when executed by one or more processors of a computing device, will cause a computing device to: analyze a DNN to select a data structure to be encoded during training of the DNN based upon layers in a layer pair of the DNN; create a modified DNN by adding at least one encode function to the DNN for encoding the selected data structure during a forward training pass; determine a lifetime of the selected data structure during training of the modified DNN; generate a memory allocation strategy based upon the lifetime of the selected data structure; and cause the modified DNN to be trained using memory allocation strategy.

EXAMPLE Q

The computer storage media of example P, wherein a first layer of the layer pair comprises a rectified linear unit (ReLU) layer, and wherein a second layer of the layer pair comprises a pooling layer.

EXAMPLE R

The computer storage media of any of examples P-Q, wherein a first layer of the layer pair comprises a rectified linear unit (ReLU) layer, and wherein a second layer of the layer pair comprises a convolution layer.

EXAMPLE S

The computer storage media of any of examples P-R, wherein the selected data structure comprises an input feature map to a layer of the DNN, and wherein the encode function causes a precision of an input feature map or an output feature map to be reduced during the training of the DNN.

EXAMPLE T

The computer storage media of any of examples P-S, wherein creating the modified DNN further comprises adding at least one decode function for decoding the selected data structure during a backward training pass.

Based on the foregoing, it should be appreciated that technologies for efficient data encoding for deep neural network training have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:
1. A computer-implemented method, comprising:
performing an analysis of a deep neural network (DNN) computation graph for a DNN to identify one or more data structures created during training of the DNN, the DNN computation graph specifying a plurality of layer pairs;
selecting a data structure from the one or more data structures created during training of the DNN, the data structure selected in response to identifying a layer pair in the plurality of layer pairs having a first layer of a first layer type and a second layer of a second layer type, the second layer being adjacent to the first layer;

based on a predetermined correspondence between a plurality of different combinations of layer types of pairs of adjacent layers and a plurality of different encode functions, selecting an encode function to encode the selected data structure during a forward training pass of the DNN, the encode function selected based on the first layer type and the second layer type being a particular combination of layer types in the plurality of different combinations of layer types that corresponds to the encode function;

creating a modified DNN computation graph by adding at least one node to the DNN computation graph, the at least one node defining the encode function; and causing the DNN to be trained using the modified DNN computation graph.

2. The computer-implemented method of claim 1, wherein the first layer of the layer pair comprises a rectified linear unit (ReLU) layer, and wherein the second layer of the layer pair comprises a pooling layer.

3. The computer-implemented method of claim 2, wherein the selected data structure comprises a positive value map (PVM) indicating whether values in an input feature map to the ReLU layer of the DNN were positive.

4. The computer-implemented method of claim 2, wherein the selected data structure comprises a mapping between an output feature map generated by the pooling layer and an input feature map to the pooling layer.

5. The computer-implemented method of claim 1, wherein creating the modified DNN computation graph further comprises adding at least one node defining a decode function for decoding the selected data structure during a backward pass of the DNN while training the DNN.

6. The computer-implemented method of claim 1, wherein the first layer of the layer pair comprises a rectified linear unit (ReLU) layer, and wherein the second layer of the layer pair comprises a convolution layer.

7. The computer-implemented method of claim 6, wherein the selected data structure comprises an output feature map generated by the ReLU layer.

8. The computer-implemented method of claim 6, wherein the selected data structure comprises an input feature map consumed by the convolution layer.

9. The computer-implemented method of claim 1, wherein the selected data structure comprises an input feature map to a layer of the DNN, and wherein the encode function causes a precision of the input feature map to be reduced during training of the DNN.

10. The computer-implemented method of claim 1, wherein the selected data structure comprises an output feature map generated by a layer of the DNN, and wherein the encode function causes a precision of the output feature map to be reduced during training of the DNN.

11. A computing device, comprising:
one or more processors; and
at least one computer storage media having computer-executable instructions stored thereupon which, when executed by the one or more processors, will cause the computing device to:
analyze a deep neural network (DNN) computation graph for a DNN to identify one or more data structures created during training of the DNN, the DNN computation graph specifying a plurality of layer pairs;
select a data structure from the one or more data structures created during training of the DNN, the data structure selected in response to identifying a layer pair in the plurality of layer pairs having a first layer of a first layer type and a second layer of a second layer type, the second layer being adjacent to the first layer;
based on a predetermined correspondence between a plurality of different combinations of layer types of pairs of adjacent layers and a plurality of different encode functions, select an encode function to encode the selected data structure during a forward training pass of the DNN, the encode function selected based on the first layer type and the second layer type being a particular combination of layer types in the plurality of different combinations of layer types that corresponds to the encode function;
create a modified DNN computation graph by adding at least one node to the DNN computation graph, the at least one node defining the selected encode function; and
train the DNN using the modified DNN computation graph.

12. The computing device of claim 11, wherein the first layer of the layer pair comprises a rectified linear unit (ReLU) layer, and wherein the second layer of the layer pair comprises a pooling layer.

13. The computing device of claim 11, wherein the first layer of the layer pair comprises a rectified linear unit (ReLU) layer, and wherein the second layer of the layer pair comprises a convolution layer.

14. The computing device of claim 11, wherein the selected data structure comprises an input feature map to a layer of the DNN, and wherein the encode function causes a precision of an input feature map or an output feature map to be reduced during the training of the DNN.

15. A computer storage media having computer-executable instructions stored thereupon which, when executed by one or more processors of a computing device, will cause the computing device to:
analyze a deep neural network (DNN) computation graph to identify one or more data structures created during training of the DNN, the DNN computation graph specifying a plurality of layer pairs;
select a data structure from the one or more data structures created during training of the DNN, the data structure selected in response to identifying a layer pair in the plurality of layer pairs having a first layer of a first layer type and a second layer of a second layer type, the second layer being adjacent to the first layer;
based on a predetermined correspondence between a plurality of different combinations of layer types of pairs of adjacent layers and a plurality of different encode functions, select an encode function to encode the selected data structure during a forward training pass of the DNN, the encode function selected based on the first layer type and the second layer type being a particular combination of layer types in the plurality of different combinations of layer types that corresponds to the encode function;
create a modified DNN computation graph by adding at least one node to the DNN computation graph, the at least one node defining the selected encode function; and
cause the modified DNN to be trained using the modified DNN computation graph.

16. The computer storage media of claim 15, wherein the first layer of the layer pair comprises a rectified linear unit (ReLU) layer, and wherein the second layer of the layer pair comprises a pooling layer.

17. The computer storage media of claim 15, wherein the first layer of the layer pair comprises a rectified linear unit (ReLU) layer, and wherein the second layer of the layer pair comprises a convolution layer.

18. The computer storage media of claim 15, wherein the selected data structure comprises an input feature map to a layer of the DNN, and wherein the encode function causes a precision of an input feature map or an output feature map to be reduced during the training of the DNN.

19. The computer storage media of claim 15, wherein creating the modified DNN computation graph further comprises adding at least one second node to the DNN computation graph, the at least one second node defining a decode function for decoding the selected data structure during a backward training pass.

* * * * *